Figure 1:
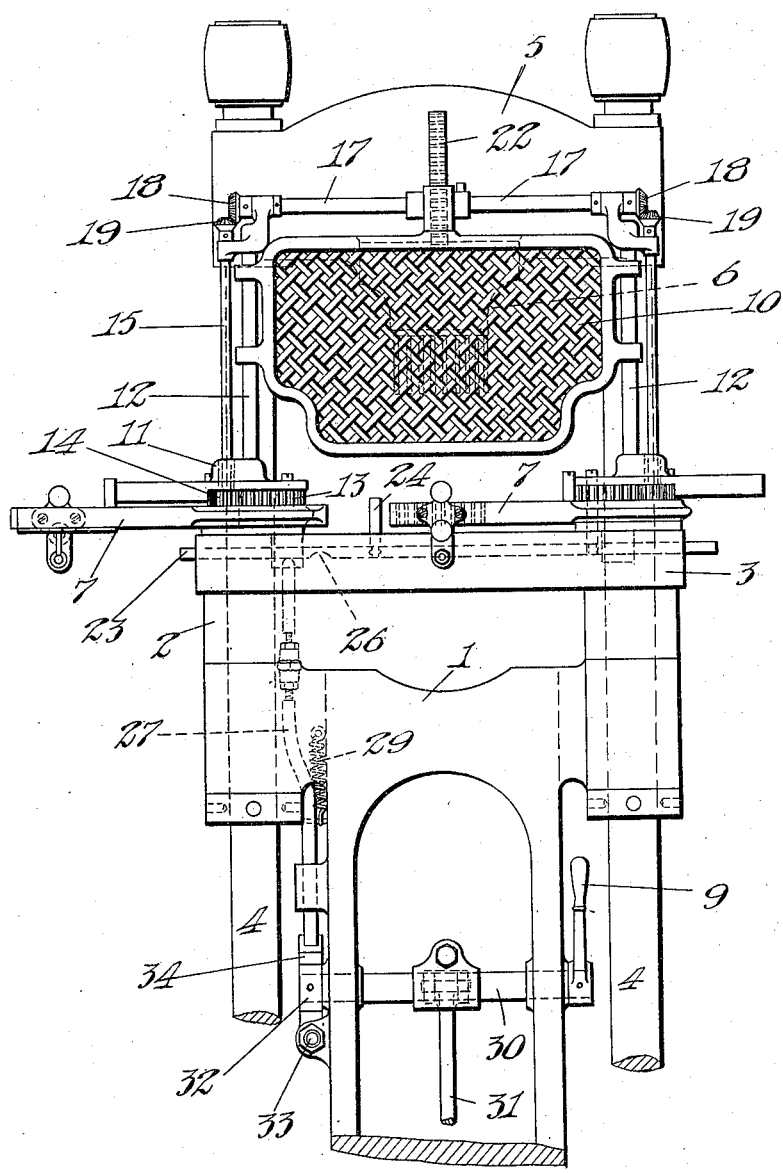

J. TRIEM.
SAFETY DEVICE.
APPLICATION FILED SEPT. 3, 1914.

1,178,606.

Patented Apr. 11, 1916.
2 SHEETS—SHEET 1.

J. TRIEM.
SAFETY DEVICE.
APPLICATION FILED SEPT. 3, 1914.
1,178,606.
Patented Apr. 11, 1916.
2 SHEETS—SHEET 2.
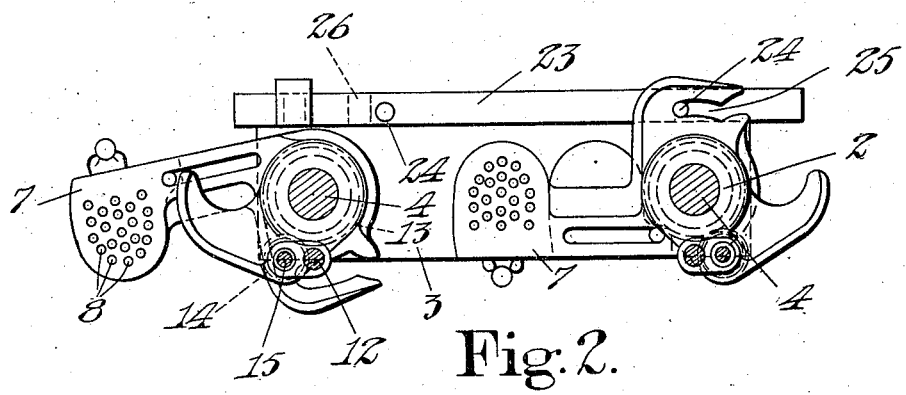
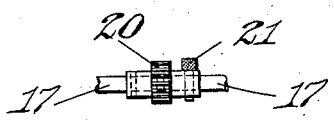
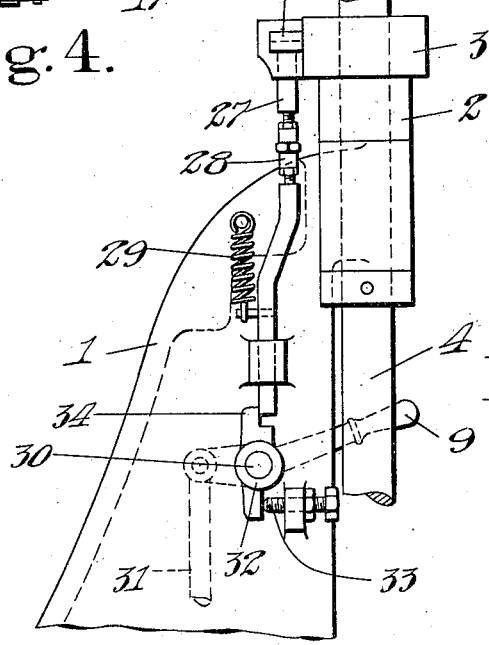

UNITED STATES PATENT OFFICE.

JAKOB TRIEM, OF FRANKFORT-ON-THE-MAIN, GERMANY, ASSIGNOR TO UNITED SHOE MACHINERY COMPANY, OF PATERSON, NEW JERSEY, A CORPORATION OF NEW JERSEY.

SAFETY DEVICE.

1,178,606.  Specification of Letters Patent.  Patented Apr. 11, 1916.

Application filed September 3, 1914. Serial No. 860,044.

*To all whom it may concern:*

Be it known that I, JAKOB TRIEM, a subject of the King of Bavaria, residing at Frankfort-on-the-Main, in the Kingdom of Prussia and Empire of Germany, have invented certain Improvements in Safety Devices, of which the following description, in connection with the accompanying drawings, is a specification, like reference characters on the drawings indicating like parts in the several figures.

This invention relates to safety devices for preventing accidents to the operatives of heel nailing, or similar machines, of the type shown for example in United States Letters Patent No. 446,885, granted February 24, 1891.

Machines of the type referred to employ nail holders that are movable from a position remote from the nail block where they are filled with nails by the assistant operator of the machine, to a position over the nail block to which they are moved for loading the nail block prior to the nail-driving operation. When the nail holder occupies the last-named position there is a possibility of the machine being started, by carelessness or otherwise, while the assistant's hand is beneath the driver head of the machine. In recognition of this danger means have been provided heretofore for inclosing the space below the driver head in a fence or barrier. This barrier, must, however, be provided with a movable portion or gate which can be opened to permit the nail holders to move into and out of position over the nail block for loading the block, and movable gates have heretofore been used in this connection which were opened and closed manually, the operator of the machine being required to close the gate before starting the machine. The operator was compelled to use one hand for this purpose which prevented him from operating the machine with the desired facility and reduced the capacity of the machine; moreover, the operator was often tempted to remove the gate because of the additional burden imposed upon him by the use thereof.

With a view to obviating the above objections to former devices, an important feature of the present invention consists in providing a safety gate with operating means that insures its movement to closed position to protect the assistant operator from injury when the nail holder is removed from position over the nail block, and insures its movement to open position in advance of the nail holder's movement into loading position. Preferably these movements of the safety gate are imparted thereto by the nail holder as it is actuated by the assistant operator, or helper, so that the operator is entirely relieved from the operation thereof, and is thus enabled to give his entire attention to the starting and stopping of the machine incident to the nail driving operations. The machine is started, preferably, through a clutch which is shifted by the movement of a hand lever, treadle or like device, under the operator's control. When the nail holder is in position to deliver nails to the nail block and the safety gate is open the clutch shifting device is locked against movement, and when the holder is moved away from loading position the clutch shifter is unlocked by devices operated from the nail holder. It is therefore insured that the machine cannot be started until the safety gate is in a position to prevent the assistant operator from inserting his hands beneath the driver head, and accidents will thus be avoided.

In the preferred embodiment of the invention, the machine will be provided with a nail holder on each side, either one of which may be employed to deliver nails to the nail block as suits the convenience of the operator, and each holder will be provided with the necessary mechanism to actuate the safety gate as this holder is moved toward and from the nail block, and also with connections with the lock to prevent movement of the clutch shifter when the holder is delivering nails.

Other features of the invention than those above referred to including important details of construction and combinations of parts, will be hereinafter more particularly described, and claimed.

In the drawings: Figure 1 represents a front elevation of the upper part of a heel nailing machine with the present invention applied thereto. Fig. 2 is a plan of the nail block and nail holders. Fig. 3 is a side elevation of a portion of the machine, and Figs. 4 and 5 are detail views.

The main frame 1 of the machine supports bearings 2 within which reciprocate the rods 4, carrying at their upper ends the upper cross head 5 to which is secured the driver block 6, supporting the usual drivers. The rods 4 may be connected at their lower ends to the lower cross head which is reciprocated by suitable mechanism, (not shown) as, for example, an eccentric and connections to be driven from the main power shaft of the machine. A clutch is included in these connections, and a rod 31 extends from the movable clutch member to a starting lever 9, fulcrumed at 30 to the frame, and having a handle which extends into convenient position for manipulation by the operator.

The bearings 2 are surrounded by the nail holders 7, having nail receiving holes 8 therein, which also surround the rods 4, and are mounted to swing from a position to one side of the machine where they are located while being filled with nails, as shown at the left in Fig. 2, to a position over the nail block where they are located when the nails are being delivered to the holes in the nail block, as shown at the right in Fig. 2. The nail holders are provided with the usual devices for retaining the nails therein until the holders are positioned over the nail block, and for then permitting the nails to drop automatically into the holes of the nail block. The two nail holders are positioned upon opposite sides of the machine so that the assistant operator may use the one that is most conveniently located to him as he stands at one side of the machine.

After the nails are delivered from one of the nail holders to the nail block the nail holder is swung outwardly to the position indicated at the left in Fig. 2 and the machine is started by the operator who manipulates the hand lever 9. The heel, which is supported upon the shoe carried by the usual jack beneath the drivers, is then compressed by being forced against the nail block 3 as the jack rises, or in any other suitable manner, and the descent of the cross head 5 forces the drivers through the holes in the nail plate and drives the nails into the heel and into the shoe, as described in the aforesaid United States Letters Patent.

If machines of this type were not provided with appropriate safety devices the assistant operator would incur the danger of injury to his hands when he inserts them below the driver head, as for instance if some of the nails did not occupy the proper position in the holes of the driver plate and he attempted to direct them properly. With a view to guarding against such accidents it has been found necessary to provide some means for preventing access to the space below the driver head after the nails have been delivered from the nail holder to the driver block. Machines of this type have heretofore been provided at the rear side with a stationary guard or lattice, while the front side of the machine has been provided with a movable gate which was opened to obtain access to this space during the nail loading operation, and was closed subsequent to this operation and before the operator started the machine. The present invention provides for the operation of such a safety gate by means which does not call for any attention on the part of the operator, but which is opened and closed, preferably, by connections operated from the nail holder.

Referring to Figs. 1 and 2 of the drawings, guide rods 12 are rigidly secured in stationary brackets supported by the main frame of the machine, and a gate 10 carries perforated lugs which slide freely upon these rods, whereby the gate is vertically guided in front of the space through which the nail drivers move during the operation of the machine. Each of the nail holders 7 carries a pinion 13 which meshes with a smaller pinion 14, the latter being mounted upon vertical shafts 15 which are rotatably carried by suitable bearings supported from the frame of the machine. The upper ends of the rotatable shafts 15 carry beveled gears 19, which latter mesh with beveled gears 18 carried upon the outer ends of horizontal shafts 17, that are rotatably supported in bearings carried by the frame of the machine, as shown in Fig. 1. The shafts 17 are arranged in alinement, and their inner ends are received within the hub of a pinion 20, see Figs. 4 and 5. The hub of the pinion 20 is provided with two holes which aline, respectively, with two holes in the end portions of the shafts 17, and a pin 21 is arranged to pass through the holes in the hub of the gear and either one of the alining holes of the shafts 17, in order that the pinion 20 may be locked to either shaft 17, according to which one of the two nail holders is selected for operation. The pinion 20 meshes with a rack 22 which projects upwardly from the safety gate 10, so that when the pinion is rotated it will serve to operate the gate, and open or close the same according to the direction of its rotation.

With the above described construction it will be seen that when a nail holder is moved from its outer position, as shown at the left in Fig. 2, to its inner position, as shown at the right in Fig. 2, the geared connections will cause the gate to move from closed to open position, thereby exposing the space below the driver head in order that the same may be accessible to permit the nail holder to swing into said space, and to deliver nails to the holes in the nail block. When, however, the nail holder is swung in a reverse direction, the safety gate is caused to move from open to closed position, thereby guarding the space below the driver head and preventing injury to the assistant operator's hands when the driver head descends.

In order to insure that the machine may not be started when one or the other of the two nail holders is in position to deliver nails to the nail block, means is provided for locking the clutch shifting hand lever 9 against movement at all times except when the nail holders occupy their outermost position. To this end a slide 23 is supported in suitable guideways for movement at the rear of the nail block 3, said slide carrying upon its upper face two pins 24, and having upon its lower face a curved recess 26, see Fig. 1. The nail holders 7 are provided with cam shaped slots 25 adapted to coöperate with the pins 24. When either of the nail holders is moved from its outward position to its inward position, the slot 25 engages with one of the pins 24, shifting the slide laterally, and when the same nail holder is moved reversely, from its inner to its outer position, the same slot will again act upon the pin 24 and return the slide 23 to its original position. A rod 27 is guided for vertical movements in suitable ways carried by the frame of the machine, and a spring 29 connects a pin projecting from said rod with a rigid part of the frame, and normally acts to force the upper end of the rod against the under side of the slide 23. The lower end of the rod 27 coöperates with a projecting arm 34 carried rigidly upon the shaft 30, which latter is fixed to the starting lever 9 for shifting the clutch, heretofore described. The shaft 30 also carries a stop which projects in an opposite direction from the projection 34, and coöperates with an adjustable stop screw 33 to limit the upward movement of the starting lever 9. When the nail holders occupy their outward position as shown at the left of Fig. 2 the safety gate is lowered, and the slide 23 is so located that the recess 26 therein is above the end of rod 27, which is thereby forced into said recess, and the lower end of the rod is raised, permitting the projection 34 to pass, and the starting lever to be moved downwardly by the operator to start the machine. When either of the nail holders, however, is moved to its inward position as shown at the right of Fig. 2, the slide 23 is shifted, and the rod 27 moved downwardly so that it acts as an obstruction to the movement of the projection 34 and locks the starting lever against movement, as shown in Fig. 3 of the drawings. It will thus be seen that the safety gate is always closed when one of the nail holders is moved from its inner to its outer position, and that the operator is prevented from starting the machine during the time that the safety gate is open and the assistant operator is engaged in delivering nails from the nail holder to the holes in the nail block, so that the assistant operator will always be prevented by the closed position of the safety gate from inserting his hands into the space below the driver head when the mechanism for starting the machine is unlocked, and when the safety gate is open the starting mechanism is rendered ineffective by the lock.

Although the invention has been set forth in connection with an illustrative machine it should be understood that the invention is not limited in the scope of its application to the particular machine shown and described.

Having thus described my invention what I claim as new and desire to secure by Letters Patent of the United States is:—

1. A machine of the class described having, in combination, nail drivers, a nail block, a nail holder movable into and out of nail-delivering position, means operated by said nail holder to prevent access to the space below said drivers, and means for preventing the operation of the machine while said nail holder is in nail delivering position.

2. A machine of the class described having, in combination, nail drivers, a nail block, a nail holder movable into and out of position to deliver nails to said nail-block, a guard arranged to move in front of the space between said drivers and nail block when the holder is carried out of nail-delivering position and to move away from in front of said space when the holder is carried into nail-delivering position, and means controlled by movement of the nail holder into position to deliver nails to prevent the operation of the machine.

3. A machine of the class described having, in combination, nail drivers, a nail block, a nail holder mounted to swing toward and from position to deliver nails to said nail block, a safety gate movable into and out of position to guard the space between said nail block and drivers, connections between said nail holder and safety gate arranged to close the gate as the nail holder moves away from nail-delivering position and to open the gate as the holder moves into said position, and means constructed to render the machine operative as the nail holder moves away from nail delivering position and inoperative as the nail holder moves into nail delivering position.

4. A machine of the class described having, in combination, nail drivers, a nail block, a safety gate movable into and out of position in front of the space between said drivers and nail block, nail holders located at opposite sides of said nail block, either of which is adapted to be moved into and out of position to deliver nails to the nail block, operating devices between each of said nail holders and the safety gate, and means to connect the operating devices of either nail holder with the gate to effect opening and closing movements of the gate by the nail holder which is in operation.

5. A machine of the class described having, in combination, nail drivers, a nail block, a safety gate movable into and out of position in front of the space between said drivers and nail block, nail holders located at opposite sides of said nail block, either of which is adapted to be moved into and out of position to deliver nails to the nail block, and geared connections between each of said nail holders and the safety gate constructed and arranged to effect opening and closing movement of the gate independently of each other.

6. A machine of the class described having, in combination, a reciprocating crosshead, nail drivers carried thereby, a nail block, a safety gate movable into and out of position to guard the space between said drivers and block, means to start the machine, a nail holder, and means operated from the nail holder to open said gate and to prevent the operation of said starting means as said holder is moved into position to deliver nails to the nail block and to close the gate and permit operation of the starting means as the holder moves out of said position.

7. A machine of the class described having, in combination, a reciprocating crosshead carrying nail drivers, means for starting the machine including a manually-controlled device, a nail block below said drivers, a safety gate movable into and out of position to guard the space between said drivers and block, a nail holder arranged to move toward and from position to deliver nails to said block, and means operated from the nail holder to open the safety gate and to lock said device against movement as the holder moves into nail-delivering position and to close the safety gate and unlock said device as the holder moves out of said position.

8. A machine of the class described having, in combination, a reciprocating crosshead carrying nail drivers, a nail block, means for starting the machine including a manually operable device, a safety gate movable toward and from position in front of the space between said drivers and block, a movable nail holder to deliver nails to said block, means for opening and closing said gate, and means to prevent movement of said device when the gate is open and to permit its movement when the gate is closed.

9. A machine of the class described having, in combination, a reciprocating crosshead carrying nail drivers, a nail block, means for starting the machine including a clutch operating device, a safety gate movable toward and from position in front of the space between said drivers and block, a movable nail holder to deliver nails to said block, operative connections between said gate and nail holder, and a lock arranged to prevent movement of the clutch operating device when the gate is open and permit its movement when the gate is closed.

In testimony whereof I have signed my name to this specification in the presence of two subscribing witnesses.

JAKOB TRIEM.

Witnesses:
FREDERICK JOSEPH SCHUSSEL,
JEAN GRUND.